(12) United States Patent
Okumura et al.

(10) Patent No.: US 11,073,730 B2
(45) Date of Patent: Jul. 27, 2021

(54) DISPLAY DEVICE

(71) Applicant: Mitsubishi Electric Corporation, Chiyoda-ku (JP)

(72) Inventors: Takanori Okumura, Tokyo (JP); Naoki Nakagawa, Tokyo (JP); Toshiaki Fujino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/647,656

(22) PCT Filed: Aug. 2, 2018

(86) PCT No.: PCT/JP2018/029032
§ 371 (c)(1),
(2) Date: Mar. 16, 2020

(87) PCT Pub. No.: WO2019/106886
PCT Pub. Date: Jun. 6, 2019

(65) Prior Publication Data
US 2020/0285095 A1    Sep. 10, 2020

(30) Foreign Application Priority Data
Dec. 1, 2017    (JP) .............................. JP2017-231520

(51) Int. Cl.
*G02F 1/1345* (2006.01)
*G02F 1/1333* (2006.01)
(52) U.S. Cl.
CPC .... *G02F 1/13454* (2013.01); *G02F 1/133305* (2013.01); *G02F 2201/56* (2013.01)

(58) Field of Classification Search
None
See application file for complete search history.

(56) References Cited

U.S. PATENT DOCUMENTS

| 2009/0185127 A1 | 7/2009 | Tanaka et al. | |
| 2009/0189835 A1* | 7/2009 | Kim | G09G 3/3677 345/80 |

(Continued)

FOREIGN PATENT DOCUMENTS

| JP | 2009-244597 A | 10/2009 |
| JP | 2010-66462 A | 3/2010 |

(Continued)

OTHER PUBLICATIONS

Ohsugi, S. et al, "Statistical Properties on Mechanical Strength of Glass for Cathode Ray Tubes," Journal of the Society of Materials Science, vol. 47, No. 10, Oct. 1988, pp. 1071-1076.

(Continued)

*Primary Examiner* — Shan Liu
(74) *Attorney, Agent, or Firm* — Xsensus LLP

(57) ABSTRACT

It is an object to provide technology enabling an increase in durability against cracking of a curved display panel having a non-rectangular outline shape. A non-rectangular curved display device includes a liquid crystal panel including an array substrate and liquid crystal driving ICs arranged on the array substrate. The liquid crystal panel is curved to have a valley extending in a second direction perpendicular to a first direction between opposite ends of an outline shape, and opposite ends being two ends of each of the liquid crystal driving ICs opposing in the first direction are located, in plan view, to be out of straight lines extending from corner portions in the second direction.

4 Claims, 16 Drawing Sheets

(56) References Cited

U.S. PATENT DOCUMENTS

| | | | |
|---|---|---|---|
| 2010/0156945 A1 | 6/2010 | Yoshida | |
| 2010/0220052 A1* | 9/2010 | Dunn | G09G 3/3611 345/103 |
| 2012/0112988 A1* | 5/2012 | Nakanishi | G02F 1/134309 345/76 |
| 2015/0173171 A1* | 6/2015 | Kim | G06F 1/1637 361/749 |
| 2015/0211707 A1 | 7/2015 | Watanabe | |
| 2015/0316810 A1 | 11/2015 | Shibahara | |
| 2016/0035307 A1* | 2/2016 | Jeon | G09G 3/20 345/211 |
| 2016/0240157 A1 | 8/2016 | Aoki et al. | |
| 2016/0255739 A1 | 9/2016 | Yoo et al. | |
| 2016/0291378 A1* | 10/2016 | Li et al. | |
| 2017/0110479 A1* | 4/2017 | Chen | G02F 1/136204 |
| 2017/0139249 A1 | 5/2017 | Moon et al. | |
| 2017/0322446 A1 | 11/2017 | Tae et al. | |
| 2018/0081232 A1* | 3/2018 | Park | G02F 1/13306 |
| 2018/0122303 A1* | 5/2018 | Tsai | G02F 1/13452 |
| 2018/0246386 A1* | 8/2018 | Hashiguchi | G02F 1/136286 |
| 2019/0285919 A1* | 9/2019 | Kiyota | B32B 7/12 |
| 2020/0310207 A1* | 10/2020 | Chen | G02F 1/136286 |

FOREIGN PATENT DOCUMENTS

| | | |
|---|---|---|
| JP | 2012-103335 A | 5/2012 |
| JP | 2013-134295 A | 7/2013 |
| JP | 2016-148775 A | 8/2016 |
| JP | 2016-161936 A | 9/2016 |
| WO | WO 2008/013013 A1 | 1/2008 |
| WO | WO 2008/062575 A1 | 5/2008 |
| WO | WO 2014/002779 A1 | 1/2014 |
| WO | WO 2014/010463 A1 | 1/2014 |

OTHER PUBLICATIONS

Japanese Office Action dated Jan. 8, 2019 in Japanese Patent Application No. 2018-560115 drafted on Dec. 27, 2018, citing documents AJ and AU-AV therein (with English translation), 10 pages.

International Search Report dated Oct. 16, 2018 in PCT/JP2018/029032 filed Aug. 2, 2018, citing documents AA-AG and AM-AQ therein, 2 pages.

Chinese Office Action dated May 25, 2021 in Chinese Application No. 201880068697.2.

* cited by examiner

F I G. 1
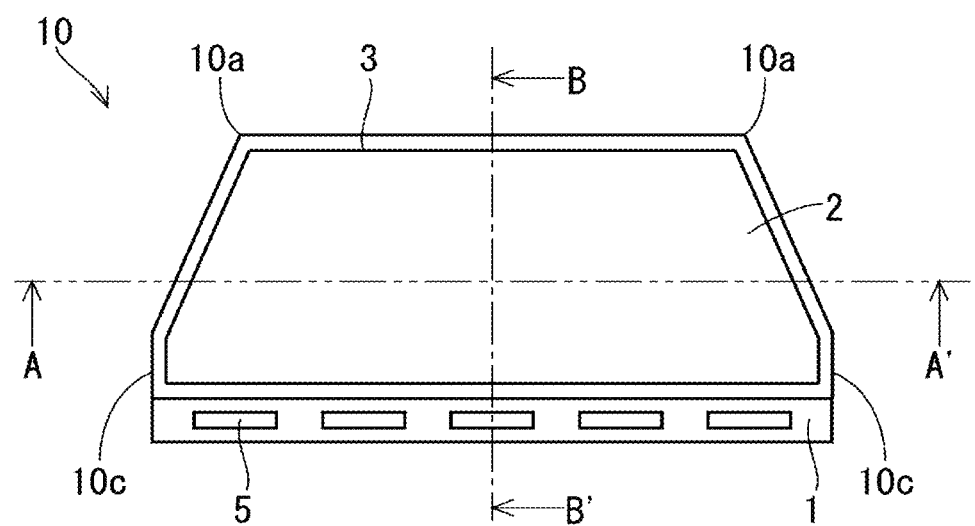
F I G. 2
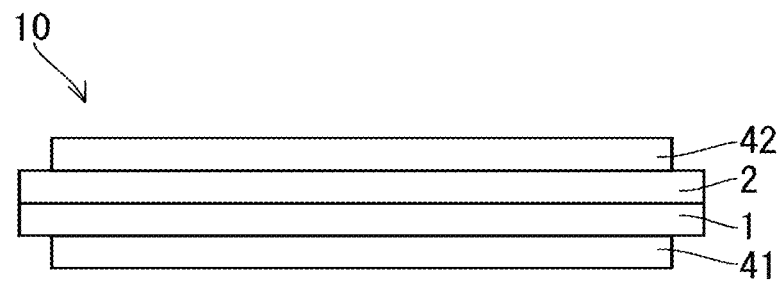

F I G. 9
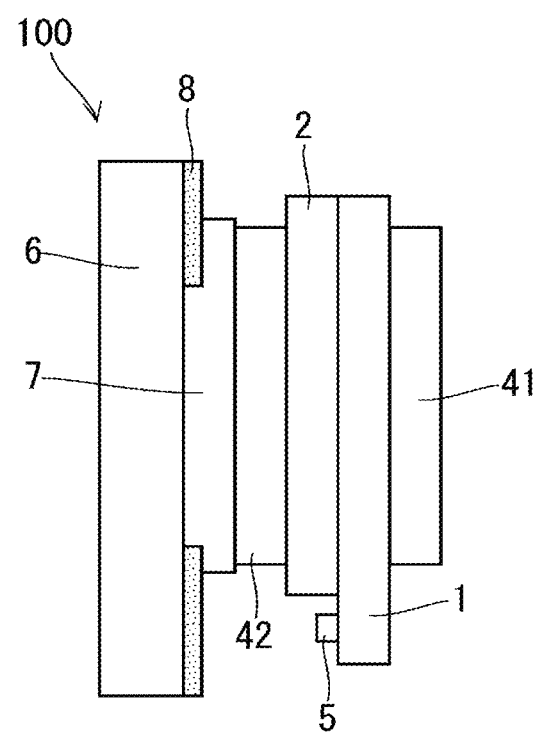

| SAMPLE NAME | 1-1 | 1-2 |
|---|---|---|
| AFTER MANUFACTURE OF SAMPLE | 0 | 1 |
| AFTER 500 HOURS AT 85 °C AND 85% | 0 | 3 |

| SAMPLE NAME | 2-1 | 2-2 |
|---|---|---|
| AFTER MANUFACTURE OF SAMPLE | 0 | 2 |
| AFTER 500 HOURS AT 85 °C AND 85% | 0 | 2 |

| SAMPLE NAME | 3-1 | 3-2 |
|---|---|---|
| AFTER MANUFACTURE OF SAMPLE | 0 | 1 |
| AFTER 500 HOURS AT 85 °C AND 85% | 0 | 2 |

| SAMPLE NAME | 1-3 | 1-4 | 2-3 | 2-4 | 3-3 | 3-4 |
|---|---|---|---|---|---|---|
| AFTER MANUFACTURE OF SAMPLE | 0 | 0 | 0 | 0 | 0 | 1 |
| AFTER 500 HOURS AT 85 °C AND 85% | 0 | 2 | 0 | 2 | 0 | 2 |

DISPLAY DEVICE

TECHNICAL FIELD

The present invention relates to a display device including a display panel having a non-rectangular outline shape.

BACKGROUND ART

New display devices having thin flat display panels utilizing principles of liquid crystals, electroluminescence, and the like have come into greater use in recent years. Liquid crystal displays (LCDs) representative of these new display devices are thin and lightweight, and are thus often used, for example, as in-vehicle display devices, such as speedometers of automobiles and display devices of navigation systems, for drivers. The LCDs are also used in vehicles, such as automobiles and airplanes, to display entertainment videos recorded on video media, such as digital versatile discs (DVDs) and Blu-ray discs, for passengers.

A typical LCD includes a liquid crystal panel including a pair of substrates in which an array substrate having pixel electrodes and a color filter substrate having a common electrode are bonded together to sandwich liquid crystals therebetween, a backlight unit, a circuit to supply various electrical signals to the liquid crystal panel, a power supply, and a housing to contain them.

The LCD has an active area in which a plurality of pixels are arranged to display images and videos and a non-active area as the peripheral area of the active area. Thin film transistors as switching elements, pixel electrodes, and the like are provided in the active area. The LCD displays images and videos through application of voltages optionally controlled by the thin film transistors across the pixel electrodes and the common electrode to change molecular orientation of the liquid crystals to thereby control transmittance when light of a backlight passes through the liquid crystal panel. In the peripheral area as the non-active area, a sealing material to seal the liquid crystals between the substrates, routing wires connected to the thin film transistors and the like, driving integrated circuits (ICs), and a terminal for connection to an external driving circuit are disposed, for example.

In a recent LCD, the liquid crystal panel is bonded to decorative printed protective glass using an adhesive sheet or an adhesive resin to improve visibility and to provide robustness. Among the LCDs, a curved LCD has a configuration in which a thin planar liquid crystal panel is bonded to a curved surface of the decorative printed protective glass in a state of being bent using the adhesive sheet or the adhesive resin. In an automotive application, there is a growing demand for a non-rectangular liquid crystal panel not having a rectangular outline shape but having a trapezoidal outline shape, an arc outline shape, and the like to improve design and aesthetics in a limited space. In response to the demand, non-rectangular curved LCDs in which thin non-rectangular liquid crystal panels are bonded to curved decorative printed protective glass have actively been developed.

Liquid crystal panels are herein manufactured by cutting two mother glass substrates bonded together into pieces each having a predetermined size. The liquid crystal panels are cut out of the two mother glass substrates bonded together by forming cut wounds from which cutting is started in a front surface and a back surface of the mother glass substrates using a scribing wheel, and then applying stress to the cut wounds to divide the glass substrates. Laser scribing is considered as a method of cutting the liquid crystal panels out of the mother glass substrates. Laser scribing is a method of forming a scribe groove in a glass substrate using a laser scriber, such as a so-called carbon dioxide laser, and then applying stress to the scribe groove to divide the glass substrate. In laser scribing, a laser highly absorbed into the glass substrate to be divided, such as the carbon dioxide laser, is used, and a divided portion is thermally expanded and then contracted, for example, through water cooling to cause local strain to thereby form the above-mentioned scribe groove in the surface of the substrate.

In any cutting method, a microscopic damage, such as a flaw and a crack, is caused in a cut surface of the substrate, and such a flaw and a crack remaining in an end surface of the substrate grow by stress applied thereafter to reduce durability.

It is thus desired to improve the strength of the end surface of the substrate in the curved LCD, and some methods for improving the strength of the end surface of the substrate are proposed for a typical curved LCD. For example, Patent Document 1 discloses measures to pattern films on glass substrates so that no films having a higher absorption coefficient for laser light than the glass substrates are present in an irradiation area of the laser light to obtain a clean break surface to thereby secure durability when the substrates are curved. Patent Document 2 discloses measures to fuse or grind to remove a cutting damage in an end surface of a substrate deformed by curving to form an enhanced surface to thereby improve durability. Patent Document 3 discloses measures to dispose shorter sides of liquid crystal driving ICs parallel to a curving direction to prevent the liquid crystal driving ICs from being separated from an insulating substrate by a load caused by bending stress caused in the liquid crystal driving ICs.

PRIOR ART DOCUMENTS

Patent Documents

Patent Document 1: Japanese Patent Application Laid-Open No. 2009-244597
Patent Document 2: Japanese Patent Application Laid-Open No. 2010-066462
Patent Document 3: WO 2008/013013

SUMMARY

Problem to be Solved by the Invention

Technology disclosed in Patent Documents 1 to 3 relates to the typical curved LCD, and does not relate to a non-rectangular curved LCD having a non-rectangular shape and manufactured by cutting a substrate into pieces each having a non-rectangular shape including an arc and the like through scribing and use of a laser. The inventors of the present application have found that, in the non-rectangular curved LCD, cutting quality is reduced in an arc portion and the like compared with that in a straight line portion. The inventors of the present application have also found that a portion on which stress is concentrated is caused by the non-rectangular shape and arrangement of the liquid crystal driving ICs. The inventors of the present application have found that, in the non-rectangular curved LCD having the non-rectangular shape, great stress caused at the ends of the liquid crystal driving ICs affects a non-rectangular portion to significantly reduce durability of the non-rectangular curved LCD.

The present invention has been conceived in view of a problem as described above, and it is an object of the present invention to provide technology enabling an increase in durability against cracking of a curved display panel having a non-rectangular outline shape.

Means to Solve the Problem

A display device according to the present invention includes: a display panel including a substrate; and at least one electronic part disposed on the substrate, the electronic part being at least one of a driving IC and a flexible printed circuit board, wherein the display panel has, in plan view, a non-rectangular outline shape and including a corner portion located between opposite ends of the display panel opposing in a first direction and formed by a curved line or two straight lines, the display panel is curved to have a valley extending in a second direction perpendicular to the first direction between the opposite ends of the outline shape, and opposite ends being two ends of the electronic part opposing in the first direction are each located, in plan view, to be out of a straight line extending from the corner portion in the second direction.

Effects of the Invention

According to the present invention, the opposite ends being two ends of the electronic part opposing in the first direction are each located, in plan view, to be out of the straight line extending from the corner portion in the second direction. Durability against cracking of the curved display panel having the non-rectangular outline shape can thereby be increased.

The objects, features, aspects, and advantages of the present invention will become more apparent from the following detailed description and the accompanying drawings.

BRIEF DESCRIPTION OF DRAWINGS

FIG. 1 is a plan view illustrating appearance of a liquid crystal panel according to Embodiment 1.

FIG. 2 is a sectional view illustrating a configuration of the liquid crystal panel according to Embodiment 1.

FIG. 9 is a sectional view illustrating a configuration of the non-rectangular curved display device according to Embodiment 1.

DESCRIPTION OF EMBODIMENTS

Embodiments of a display device according to the present invention will be described below with reference to the drawings. In description below, the same components bear the same reference signs, and have the same names. Functions thereof include substantially the same functions. Detailed description thereof is thus sometimes omitted. Dimensions, materials, shapes, and relative arrangement of components described in Embodiments are changed appropriately depending on a configuration of a device to which the present invention is applied and various conditions, and the present invention is not limited by the description. Dimensions of components in each of the drawings are sometimes different from actual dimensions. An example of an LCD including a liquid crystal panel as a display panel is described in each of Embodiments below, but the display panel is not limited to the liquid crystal panel, and may be a display panel of an organic electroluminescent display.

Embodiment 1

<Configuration of Liquid Crystal Panel>

Figure 3:
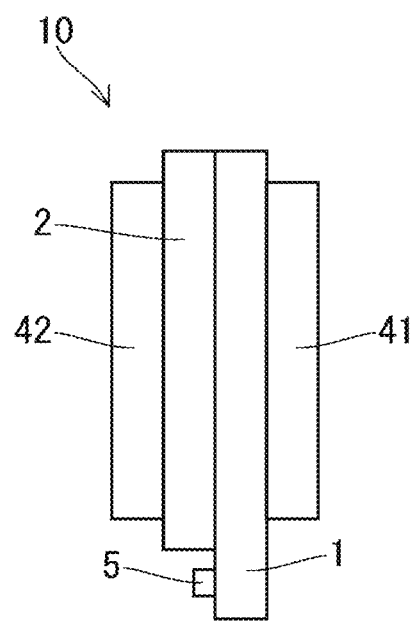
FIG. 3 is a sectional view illustrating a configuration of the liquid crystal panel according to Embodiment 1.

FIG. 1 is a plan view illustrating appearance of a liquid crystal panel 10 of a non-rectangular curved display device as a display device according to Embodiment 1. FIG. 2 is a sectional view of the liquid crystal panel 10 taken along the line A-A' of FIG. 1, and FIG. 3 is a sectional view of the liquid crystal panel 10 taken along the line B-B' of FIG. 1.

The liquid crystal panel 10 as a display panel is operated using thin film transistors (TFTs) as switching elements. The liquid crystal panel 10, however, is not limited to be operated using the TFTs, and may be operated using other switching elements.

Figure 4:
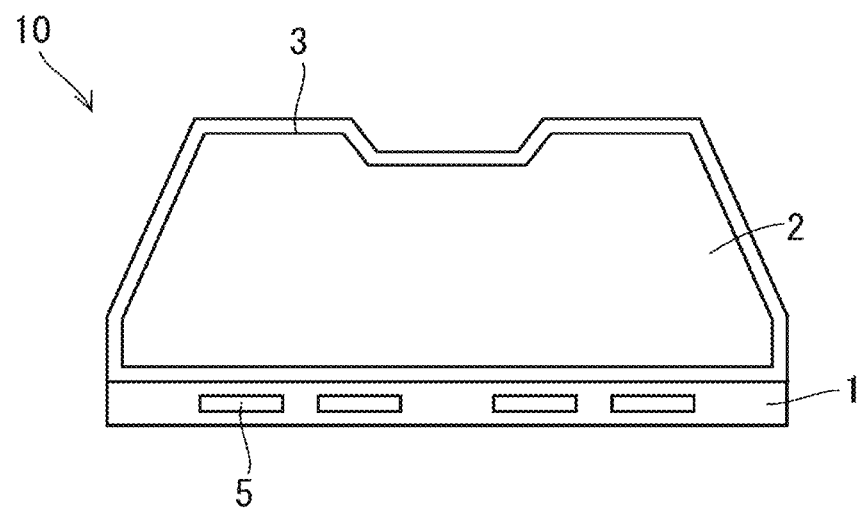
FIG. 4 is a plan view illustrating appearance of a liquid crystal panel according to Embodiment 1.
Figure 5:
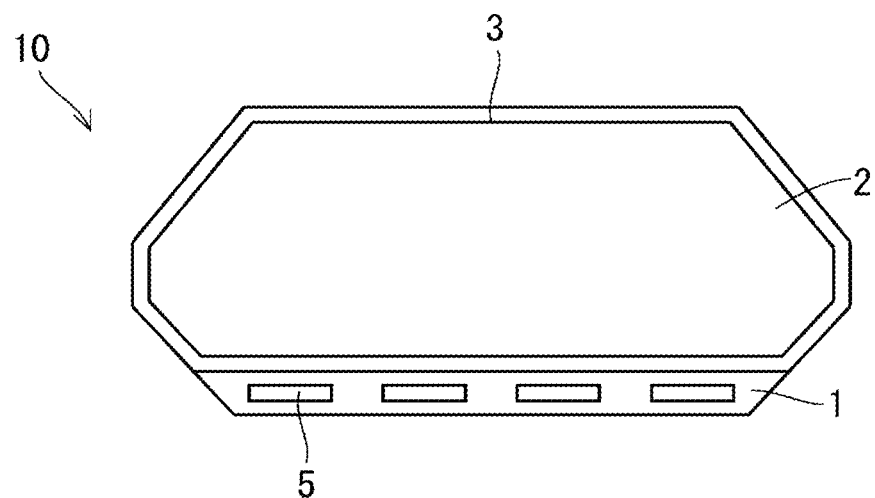
FIG. 5 is a plan view illustrating appearance of a liquid crystal panel according to Embodiment 1.
Figure 6:
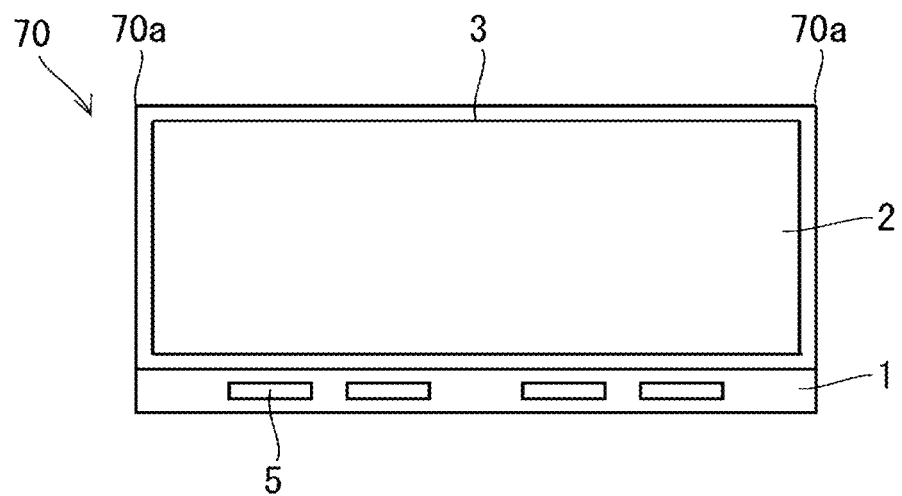
FIG. 6 is a plan view illustrating appearance of a liquid crystal panel relating to the liquid crystal panel according to Embodiment 1.

The liquid crystal panel 10 illustrated in FIG. 1 has a hexagonal outline shape as an example, but the outline shape of the liquid crystal panel 10 is not limited to this shape. As illustrated in FIGS. 4 and 5, for example, the liquid crystal panel 10 may have an octagonal outline shape, an arc outline shape, a recessed outline shape, and the like. That is to say, the liquid crystal panel 10 is only required to have a non-rectangular outline shape in plan view. As illustrated in FIG. 1, the outline shape is only required to include corner portions 10a located between opposite ends 10c of the liquid crystal panel 10 opposing in a longitudinal direction of the liquid crystal panel 10 (a first direction) and each having an angle greater than 0° and smaller than 360°. As described below, the corner portions 10a are each formed by a curved line or two straight lines in enlarged view. In description below, the outline shape as described above is also referred to as a "non-rectangular shape". For reference, FIG. 6 illustrates appearance of a liquid crystal panel 70 relating to the liquid crystal panel 10 according to Embodiment 1 and having a rectangular outline shape.

The liquid crystal panel 10 includes an array substrate 1 on which switching elements are arranged and a color filter substrate 2 disposed to oppose the array substrate 1. The array substrate 1 and the color filter substrate 2 are bonded together using a sealing material 3.

The sealing material 3 is sandwiched between the array substrate 1 and the color filter substrate 2. The sealing material 3 is thus viewed through the color filter substrate 2. The sealing material 3, however, is not illustrated in FIGS. 2 and 3 for simplicity.

The sealing material 3 is formed of a resin, for example. As illustrated in FIG. 1, the sealing material 3 has a pattern to enclose an area corresponding to a display surface (display area) of the liquid crystal panel 10 including the array substrate 1 and the color filter substrate 2. Liquid crystals, which are not illustrated, are held in a space enclosed by the sealing material 3 and formed between the array substrate 1 and the color filter substrate 2.

The array substrate 1 has, on one surface thereof, (1) an alignment film to align the liquid crystals in the area corresponding to the display surface, (2) pixel electrodes located below the alignment film to apply voltages to drive the liquid crystals, (3) a common electrode to generate an electric field between the pixel electrodes and the common electrode to drive the liquid crystals, (4) switching elements, such as TFTs, to supply voltages to the pixel electrodes, (5) an insulating film to cover the switching elements, and (6) gate wiring and source wiring to supply signals to the switching elements, and the like, although they are not illustrated.

The array substrate 1 has a polarizing plate 41 on the other surface. That is to say, the polarizing plate 41 is bonded to the surface of the array substrate 1 not in contact with the liquid crystals through an adhesive material, which is not illustrated. The array substrate 1 is configured by a transparent substrate, such as a glass substrate.

In an area external to the area corresponding to the display surface of the array substrate 1, a terminal, which is not illustrated, to externally receive the signals supplied to the switching elements and liquid crystal driving integrated circuits (ICs) 5 to transmit drive signals are provided as illustrated in FIGS. 1 and 3. In Embodiment 1, the liquid crystal driving ICs 5 are arranged along the longitudinal direction of the liquid crystal panel 10 in an area not overlapping the display surface of the array substrate 1. Although not illustrated, the terminal of the liquid crystal panel 10 is electrically connected to a control substrate through a flexible flat cable (FFC).

The color filter substrate 2 is disposed to oppose the array substrate 1. The color filter substrate 2 is configured by a transparent substrate, such as a glass substrate. The color filter substrate 2 has, on a surface opposing the array substrate 1, (1) an alignment film to align the liquid crystals, (2) a color filter and a light-shielding layer located below the alignment film, and the like, although they are not illustrated.

The color filter substrate 2 has a polarizing plate 42 on the other surface. That is to say, the polarizing plate 42 is bonded to the surface of the color filter substrate 2 not in contact with the liquid crystals through an adhesive material, which is not illustrated.

The array substrate 1 and the color filter substrate 2 are bonded together through a gap material, which is not illustrated, to maintain a constant distance between the substrates. As the gap material, a granular gap material dispersed on the substrates and a columnar gap material formed by patterning a resin on one of the substrates may be used.

The non-rectangular curved display device includes a backlight unit as a light source on a side opposite a side of the display surface of the liquid crystal panel 10 to oppose the array substrate 1, although it is not illustrated in FIGS. 1 to 3. Parts constituting the backlight unit are fixed at the periphery not to be displaced in an in-plane direction and in a cross-sectional direction of a panel unit including the liquid crystal panel 10.

The liquid crystal panel 10 according to Embodiment 1 is a liquid crystal panel in an in-plane switching (IPS) mode. The liquid crystal panel in the in-plane switching mode includes the array substrate 1 provided with the common electrode and the pixel electrodes, and uses an in-plane switching method of applying an electric field between the electrodes to apply the electric field laterally to the liquid crystals.

An operation mode of the liquid crystal panel 10, however, is not limited to this mode, and may be another operation mode. For example, the operation mode of the liquid crystal panel 10 may be a vertically aligned (VA) mode, a twisted nematic (TN) mode, a ferroelectric liquid crystal mode, or the like.

In Embodiment 1, the liquid crystal panel 10 is a transmissive liquid crystal panel, but the liquid crystal panel 10 is not limited to the transmissive liquid crystal panel, and may be a reflective liquid crystal panel or a partially-transmissive liquid crystal panel as a combination of the transmissive liquid crystal panel and the reflective liquid crystal panel.

Figure 7:
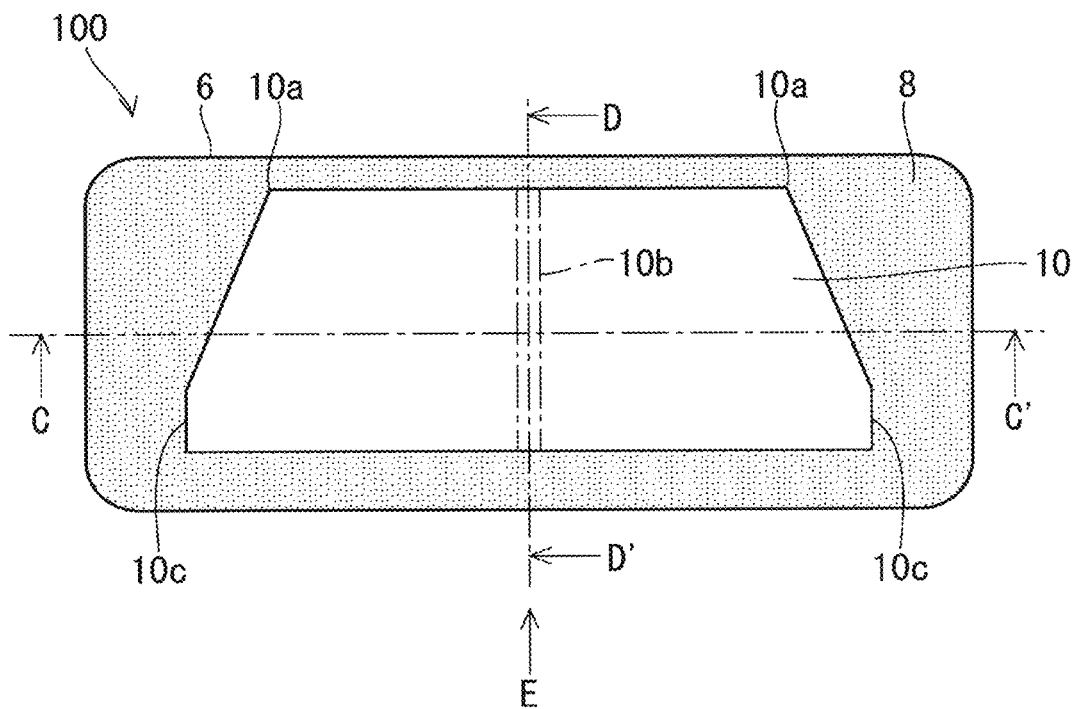
FIG. 7 is a plan view illustrating appearance of a non-rectangular curved display device according to Embodiment 1.
Figure 8:
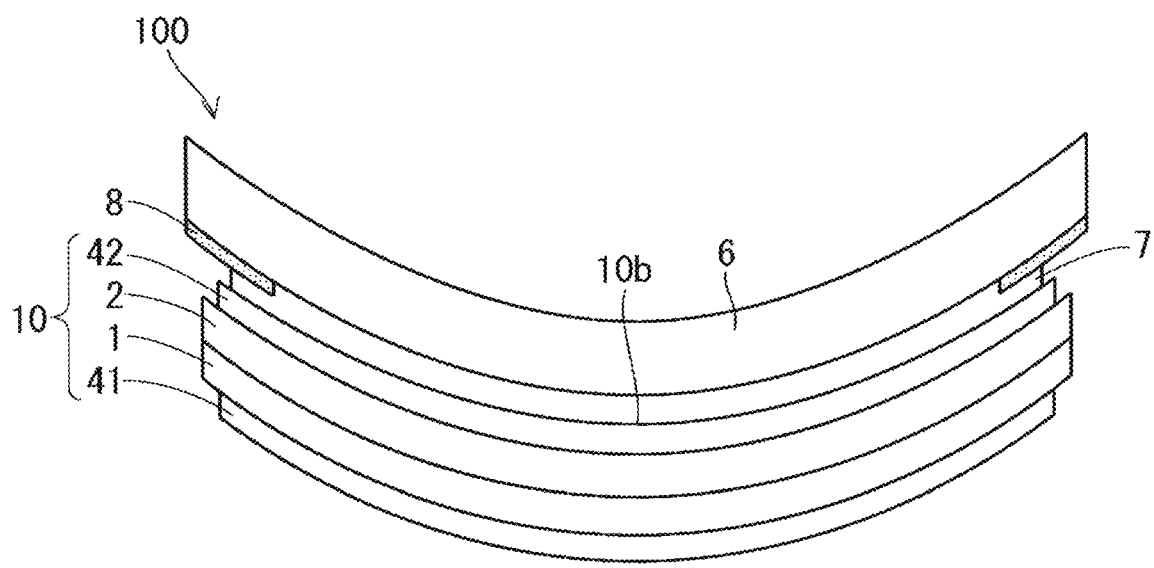
FIG. 8 is a sectional view illustrating a configuration of the non-rectangular curved display device according to Embodiment 1.

FIG. 7 is a plan view illustrating a non-rectangular curved display device 100 including the liquid crystal panel 10 and a protective plate 6. FIG. 8 is a sectional view of the non-rectangular curved display device 100 taken along the line C-C' of FIG. 7, and FIG. 9 is a sectional view of the non-rectangular curved display device 100 taken along the line D-D' of FIG. 7.

As illustrated in FIGS. 7 to 9, the non-rectangular curved display device 100 is configured by bonding the liquid crystal panel 10 to the protective plate 6 having a curved surface through an adhesive sheet 7. The liquid crystal panel 10 is bonded to the curved surface of the protective plate 6, so that the liquid crystal panel 10 is curved to have a valley 10b extending in a transverse direction (a second direction) perpendicular to the longitudinal direction (first direction) of the liquid crystal panel 10 between the opposite ends 10c of the outline shape and on a surface of the liquid crystal panel 10 on a side of the protective plate 6. In plan view of FIG. 7 and the like, a middle portion of the valley 10b is shown by alternate long and short dashed lines. The middle portion of the valley 10b may or may not have greater curvature than the other portions of the liquid crystal panel 10, for example.

The liquid crystal driving ICs 5 are provided in the curved portion of the liquid crystal panel 10. Opposite ends being two ends of each of the liquid crystal driving ICs 5 opposing in the longitudinal direction of the liquid crystal panel 10 are each located to be out of straight lines extending from the corner portions 10a in the transverse direction of the liquid crystal panel 10 (an extension direction from the corner portions 10a parallel to a direction in which the valley 10b extends), although details thereof will be described below.

<Method of Manufacturing Non-Rectangular Curved Display Device>

A method of manufacturing the liquid crystal panel 10 will be described first. The array substrate 1 is manufactured by forming the switching elements, the pixel electrodes, the terminal, and a transfer electrode on one surface of the glass substrate through repeated use of a pattern forming process, such as deposition, patterning by photolithography, and etching. As with the array substrate 1, the color filter substrate 2 is manufactured by forming the color filter and the common electrode on one surface of the glass substrate.

A process before bonding the array substrate 1 and the color filter substrate 2 together will be described next. First, in a substrate cleaning process, the array substrate 1 having the pixel electrodes formed thereon is cleaned.

Next, in an alignment film material applying process, an organic film made of polyimide as a material for the alignment film is applied to one surface of the array substrate 1, for example, through printing, and is fired using a hot plate to be dried.

The array substrate 1 to which the alignment film material has been applied is then subjected to alignment film treatment to form the alignment film. The color filter substrate 2 also undergoes cleaning, application of an organic film and drying, and alignment film treatment and formation of the alignment film.

Then, in a sealing material applying process of forming the sealing material 3, a resin serving as the sealing material 3 is applied to one surface of the array substrate 1 or the color filter substrate 2. A thermosetting resin, such as epoxy-based glue, or an ultraviolet curable resin is used as the sealing material 3.

Then, in a liquid crystal inserting process, a predetermined amount of liquid crystal material is dropped in the area enclosed by the sealing material 3 on the same surface of the array substrate 1 or the color filter substrate 2 on which the sealing material 3 has been formed.

The array substrate 1 and the color filter substrate 2 formed as described above are arranged to oppose each other, positioned so that pixels of panels formed on the substrates correspond to each other, and boned together in a vacuum.

With respect to the array substrate 1 and the color filter substrate 2 boned together as described above, the sealing material 3 is cured. This process is performed through application of heat, irradiation with ultraviolet rays, or a combination of heat application and irradiation with the ultraviolet rays, for example, in accordance with material of the sealing material 3.

Figure 10:
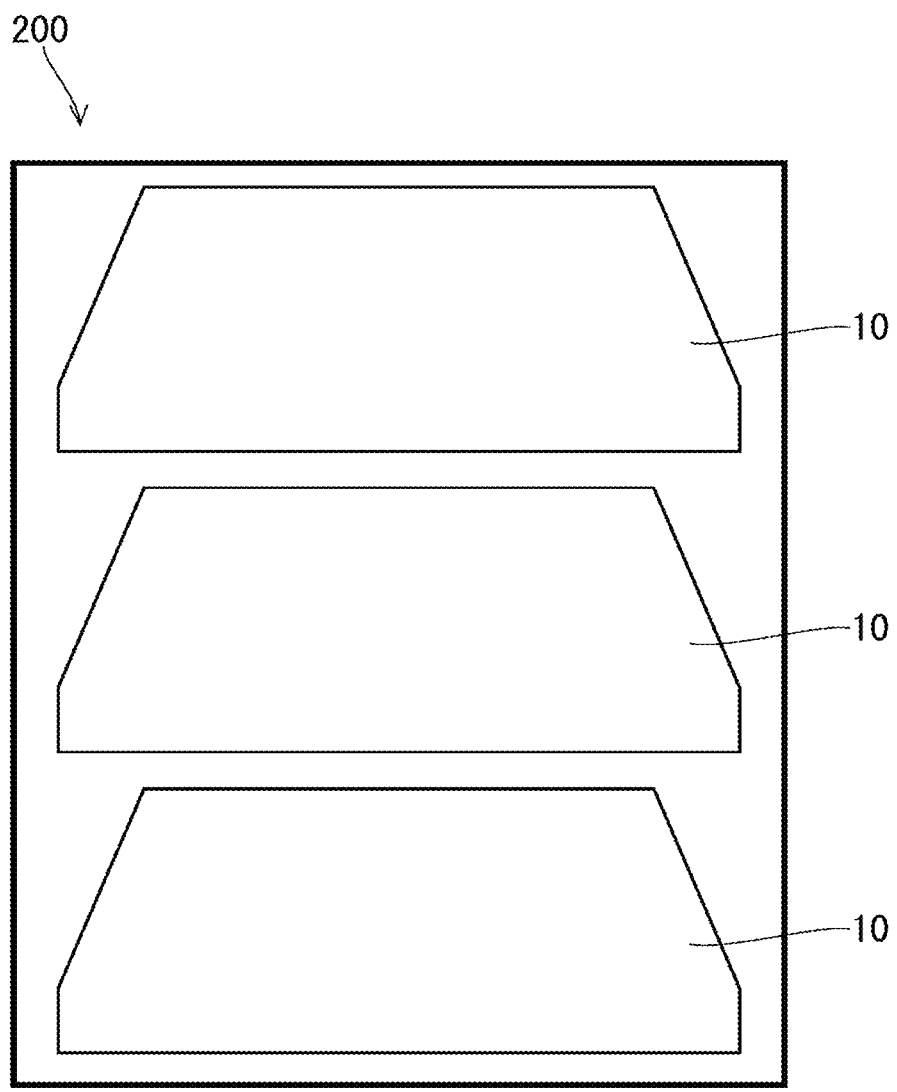
FIG. 10 is a plan view for describing a method of manufacturing the non-rectangular curved display device according to Embodiment 1.

The above-mentioned processes are performed not for each of the liquid crystal panels 10 but for each of bonded substrates 200 illustrated in FIG. 10 obtained by bonding a mother glass substrate including array substrates 1 of a plurality of liquid crystal panels 10 and a mother glass substrate including color filter substrates 2 of the plurality of liquid crystal panels 10 together. The bonded substrate 200 illustrated in FIG. 10 is formed to have a size of large rectangular mother glass substrates in which a plurality of liquid crystal panels 10 each having a non-rectangular shape are defined.

Next, in a process of thinning the bonded substrate 200, the bonded substrate 200 is thinned. The bonded substrate 200 is thinned through etching using a chemical or polishing. In Embodiment 1, the array substrate 1 and the color filter substrate 2 are each thinned to have a thickness of 200 μm. A thinning method is not particularly limited, and etching, polishing, a combination of etching and polishing, and the like can be used as the thinning method. The thicknesses of the array substrate 1 and the color filter substrate 2 are not particularly defined, and are determined by curvature of curves and other design factors.

Before being thinned, the bonded substrate 200 is sealed at the periphery thereof using an ultraviolet curable resin material, which is not illustrated. This is because, if the bonded substrate 200 is etched or polished without being sealed at the periphery using the ultraviolet curable resin material, an etchant or a polishing liquid enters from the periphery of the bonded substrate 200. A sealing material to prevent entrance of the etchant and the polishing liquid is not limited to the ultraviolet curable resin material, and a thermosetting resin and the like can be used, for example.

Next, in a cell dividing process, the bonded substrate 200 is divided into the plurality of liquid crystal panels 10 each having the non-rectangular shape. As one example of dividing, cut wounds (vertical cracks) from which cutting is started are first formed in a front surface and a back surface of the bonded substrate 200, that is to say, in respective surfaces of the two mother glass substrates, along the thickness of glass using a scribing wheel. Stress is then applied to the cut wounds to divide the glass substrates.

Then, in a polarizing plate bonding process, the polarizing plates are bonded to outer sides of the array substrate 1 and the color filter substrate 2 using a roller device. A method of bonding the polarizing plates is not particularly limited. Furthermore, in an implementing process, the liquid crystal driving ICs 5, the control substrate, and the like are connected to wiring of the array substrate 1 to be connected thereto to complete the liquid crystal panel 10. The liquid crystal driving ICs 5, the control substrate, and the like are connected to the wiring, for example, using anisotropic conductive films.

A bonding material, such as glue, an adhesive, and an adhesive sheet, is provided between the liquid crystal panel 10 manufactured as described above and the protective plate 6 to be disposed with respect to the liquid crystal panel 10 to be visible, for example, to bond the liquid crystal panel 10 and the protective plate 6 together. In Embodiment 1, the polarizing plate 42 bonded to the color filter substrate 2 of the liquid crystal panel 10 and the protective plate 6 are bonded together using the adhesive sheet 7 provided between them.

The adhesive sheet is widely used as the bonding material, but a material for the bonding material and a process of manufacturing the bonding material are not particularly limited. As the bonding material, a material having a higher refractive index than an air layer is used to prevent reflection from the protective plate and an interface. An adhesive sheet having a thickness of 25 μm to 500 μm or the like is typically used as the bonding material, but the bonding material is not particularly limited, and is determined as appropriate in view of display unevenness, bubble generation, and resistance to separation and further in view of a design factor of members constituting the non-rectangular curved display device, such as a metal frame.

The protective plate 6 is a transparent plate having transmittance of visible light of 80% or more, and is preferably made of a single material. The protective plate 6 may be a glass plate, laminated glass, a resin plate, or the like manufactured through ion exchange, tempering by air cooling, or the like to have improved strength. A polycarbonate resin, an acrylic resin, a cycloolefin resin, and the like are suitable as a material for the resin plate, for example.

These materials for the protective plate 6 are just examples, and do not limit the protective plate 6. A method of manufacturing the protective plate 6 is not limited, and cutting, polishing, injection molding, extrusion molding, compression molding, and the like are used, for example. In Embodiment 1, a glass plate having a thickness of 1.5 mm and uniformly curved by heat to have a radius of curvature of 500 mm and then tempered by air cooling to have improved strength is used as the protective plate 6. The thickness of the protective plate 6 is determined by the strength and other design factors, and is not particularly limited.

A surface of the protective plate 6 opposing the liquid crystal panel 10 has black decorative printing 8, and the decorative printing 8 has an opening corresponding to the active area of the liquid crystal panel 10. The decorative printing 8 is formed of a material shielding most of light having a wavelength in a visible area. The decorative printing 8 is only required to satisfy desired performance in terms of aesthetics, light-shielding, and the like, and a color, a method of forming, a material for the decorative printing 8, and the like are not particularly limited. A surface of the protective plate 6 from which images are visible undergoes anti-glare treatment and anti-reflection treatment to improve visibility, hard coat treatment to prevent flaws, and the like as necessary.

In Embodiment 1, the adhesive sheet 7 is used as the bonding material to bond the liquid crystal panel 10 and the protective plate 6 together as described above. Specifically, the adhesive sheet 7 is bonded to the surface of the protective plate 6 having the decorative printing 8 using the roller device, and then the protective plate 6 and the liquid crystal panel 10 are bonded together while being pressurized using the roller device. In bonding, the location of the opening of the decorative printing 8 of the protective plate 6 and the location of the active area of the liquid crystal panel 10 are adjusted while the liquid crystal panel 10 is pressurized using the roller device. A method of manufacturing the non-rectangular curved display device is not limited to this method. For example, the liquid crystal panel 10 may be bonded to the surface of the protective plate 6 having the decorative printing 8 through the adhesive sheet 7 after the adhesive sheet 7 is bonded to the liquid crystal panel 10, and pressure degassing and the like may be performed after bonding.

The backlight unit and the like and the housing are then attached to a panel module portion completed as described above using a double-sided tape, glue, and the like to complete the non-rectangular curved display device 100 having a curved display surface.

<Reduction in Cutting Quality and Strength by Cutting into Non-Rectangular Shape>

The non-rectangular curved display device has a problem in that the corner portions 10a in FIG. 1 each including an arc portion and the like have lower cutting quality than a straight line.

Figure 11:
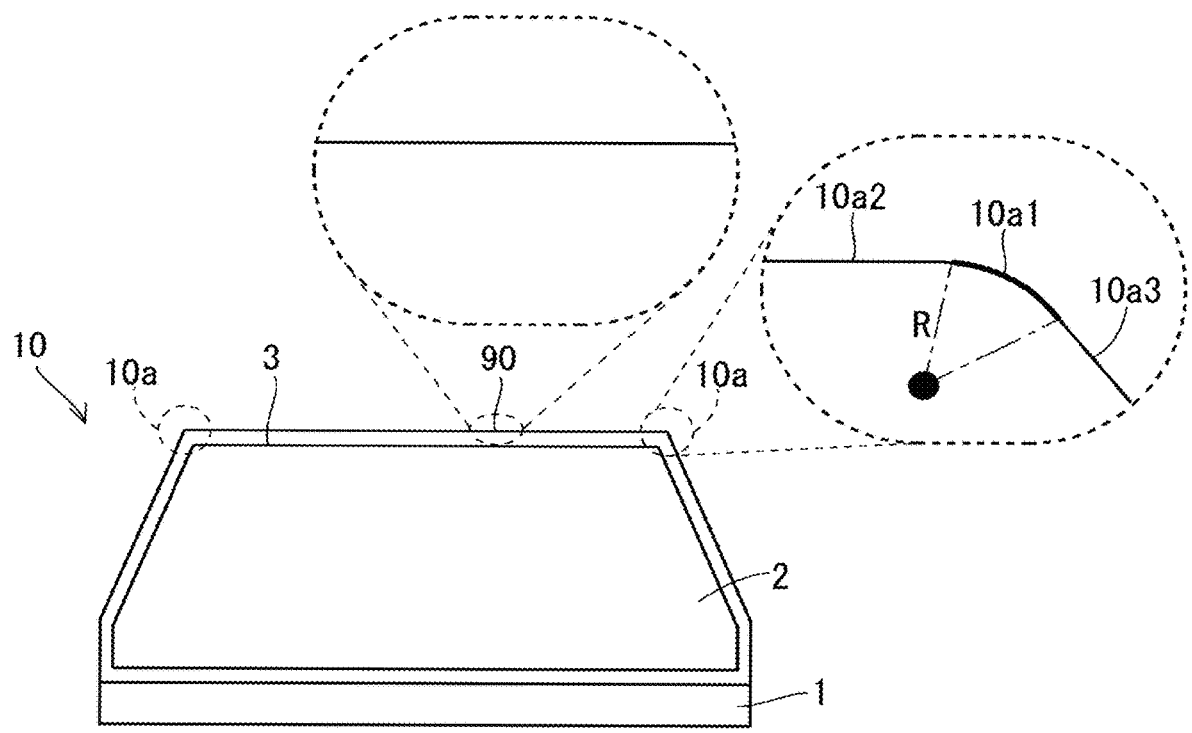
FIG. 11 is a plan view schematically illustrating the appearance of the liquid crystal panel according to Embodiment 1.

FIG. 11 is a plan view schematically illustrating appearance of the liquid crystal panel 10 having the corner portions 10a. FIG. 11 includes an enlarged view of one of the corner portions 10a and an enlarged view of a straight line portion 90 other than the corner portions 10a. The corner portion 10a in FIG. 11 includes an arc portion 10a1 Specifically, the corner portion 10a in FIG. 11 includes the arc portion 10a1 having a radius R of 4 mm to 5 mm, for example, and straight line portions 10a2 and 10a3 as two side portions connected by the arc portion 10a1.

Figure 12:
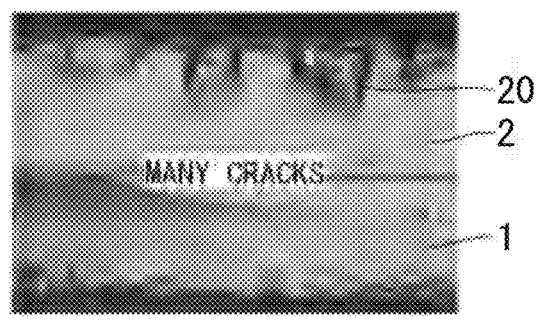
FIG. 12 shows results of observation of a cut surface of the liquid crystal panel according to Embodiment 1.
Figure 13:
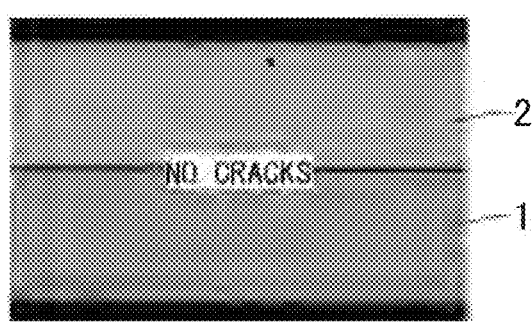
FIG. 13 shows results of observation of a cut surface of the liquid crystal panel according to Embodiment 1.

FIGS. 12 and 13 each show results of observation of a cut surface (break surface) of the array substrate 1 and the color filter substrate 2 of the liquid crystal panel 10 cut out of the bonded substrate 200. Specifically, FIG. 12 shows results of observation of one of the corner portions 10a in FIG. 11, and FIG. 13 shows results of observation of the straight line portion 90 in FIG. 11.

No cracks are observed in the straight line portion 90 as shown in FIG. 13. On the other hand, as shown in FIG. 12, many cracks 20 are observed in the corner portion 10a as damages at scribing and dividing, and reduction in cutting quality is observed. This is because, in the corner portion 10a, cut wounds cannot unidirectionally be formed, and damages, such as flaws and cracks, are likely to be caused in the cut surface of the substrate.

In the presence of the cracks, the progress of the cracks referred to as stress corrosion is observed due to the effect of moisture as known, for example, in a reference document (Ohsugi et al., Statistical Properties on Mechanical Strength of Glass for Cathode Ray Tubes, Journal of the Society of Materials Science, Japan, Vol. 47, No. 10, October 1988, p. 1071-1076). Especially in the non-rectangular curved display device, the cracks 20 are likely to progress as stress associated with curving is added. Stress corrosion occurs similarly in the cracks 20 observed in the break surface of the corner portion 10a in FIG. 12, and thus the strength of the liquid crystal panel 10 when being curved can be said to be determined by the damages in the break surface. As described above, the non-rectangular curved display device has a problem in that there is a difference in cutting quality in the straight line portion 90 and in the corner portions 10a, and the liquid crystal panel 10 has a relatively low strength in the corner portions 10a when being curved.

<Stress Concentration in Liquid Crystal Driving ICs>

Figure 14:
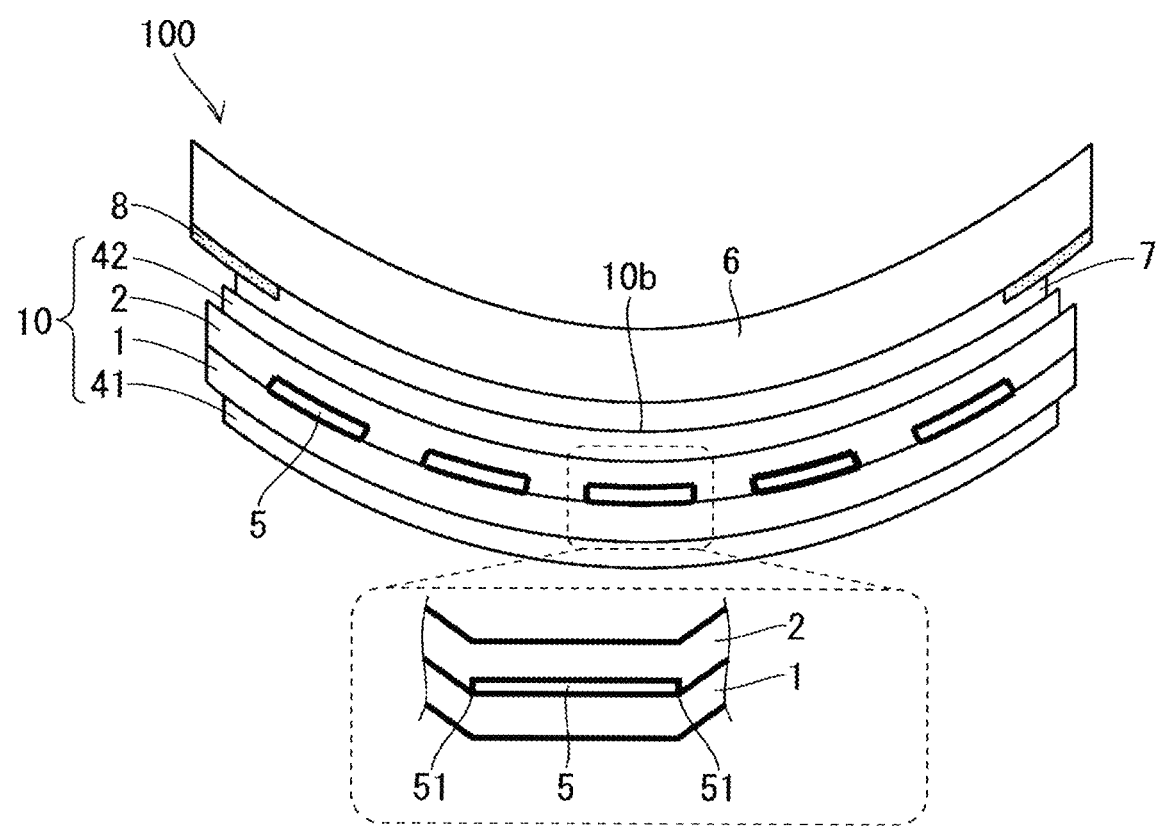
FIG. 14 is a sectional view for describing stress concentration in the non-rectangular curved display device according to Embodiment 1.

FIG. 14 is a sectional view of the non-rectangular curved display device 100 as viewed from a direction of an arrow E of FIG. 7. FIG. 14 includes an enlarged view of one of the liquid crystal driving ICs 5 and its surroundings.

As described above, the liquid crystal driving ICs 5 are connected to the array substrate 1 using the anisotropic conductive films. The array substrate 1 has a greater thickness in portions in which the liquid crystal driving ICs 5 are provided than in portions in which the liquid crystal driving ICs 5 are not provided, so that stiffness at curving is relatively high in the portions in which the liquid crystal driving ICs 5 are provided. On the other hand, at locations at which the portions in which the liquid crystal driving ICs 5 are provided and the portions in which the liquid crystal driving ICs 5 are not provided are contiguous with each other, that is to say, at opposite ends 51 being two ends of each of the liquid crystal driving ICs 5 opposing in the longitudinal direction of the liquid crystal panel 10, stress when the liquid crystal panel 10 is curved is not constant, and stress is concentrated at the opposite ends 51 of each of the liquid crystal driving ICs 5.

A ratio of strain at the opposite ends 51 of each of the liquid crystal driving ICs 5 to strain at locations of each of the liquid crystal driving ICs 5 other than the opposite ends 51, that is to say, a stress concentration factor is in a range of approximately 1.1 to 2.0, as obtained through actual measurement of the strain at the opposite ends 51 of each of the liquid crystal driving ICs 5 and the strain at the locations of each of the liquid crystal driving ICs 5 other than the opposite ends 51. As described above, there is a problem in that stress that is approximately 10% to 100% higher than that caused at the locations of each of the liquid crystal driving ICs 5 other than the opposite ends 51 is caused at the opposite ends 51 of each of the liquid crystal driving ICs 5.

<Problem of Non-Rectangular Curved Display Device>

As described above, the inventors of the present application have found that the non-rectangular curved display device has a problem in that the corner portions 10a have lower cutting quality than the straight line portion 90. They also have found that there is a problem in that stress is concentrated and increased at the opposite ends 51 of each of the liquid crystal driving ICs 5. They have found, from these problems, a problem below.

In a case where the non-rectangular flat liquid crystal panel 10 is curved to have the valley 10b extending in the transverse direction perpendicular to the longitudinal direction of the liquid crystal panel 10 between the opposite ends 10c of the liquid crystal panel 10 other than the corner portions 10a, bending stiffness is affected by the outline shape of the liquid crystal panel 10 so that the liquid crystal panel 10 cannot be curved to have a uniform radius of curvature. Stress caused by uniform curving is thus distributed along the non-rectangular shape. That is to say, in the non-rectangular curved display device having a non-rectangular shape, stress caused by uniform curving is distributed along the non-rectangular shape. It has thus been found that, if any of the opposite ends 51 of the liquid crystal driving ICs 5 at which stress is concentrated and increased are located on the straight lines extending from the corner portions 10a having low cutting quality in the transverse direction of the liquid crystal panel 10, great stress caused at the opposite ends 51 of the liquid crystal driving ICs 5 affects the corner portions 10a to significantly reduce durability.

<Positional Relationship Between Ends of Liquid Crystal Driving ICs and Corner Portions of Liquid Crystal Panel>

Figure 15:
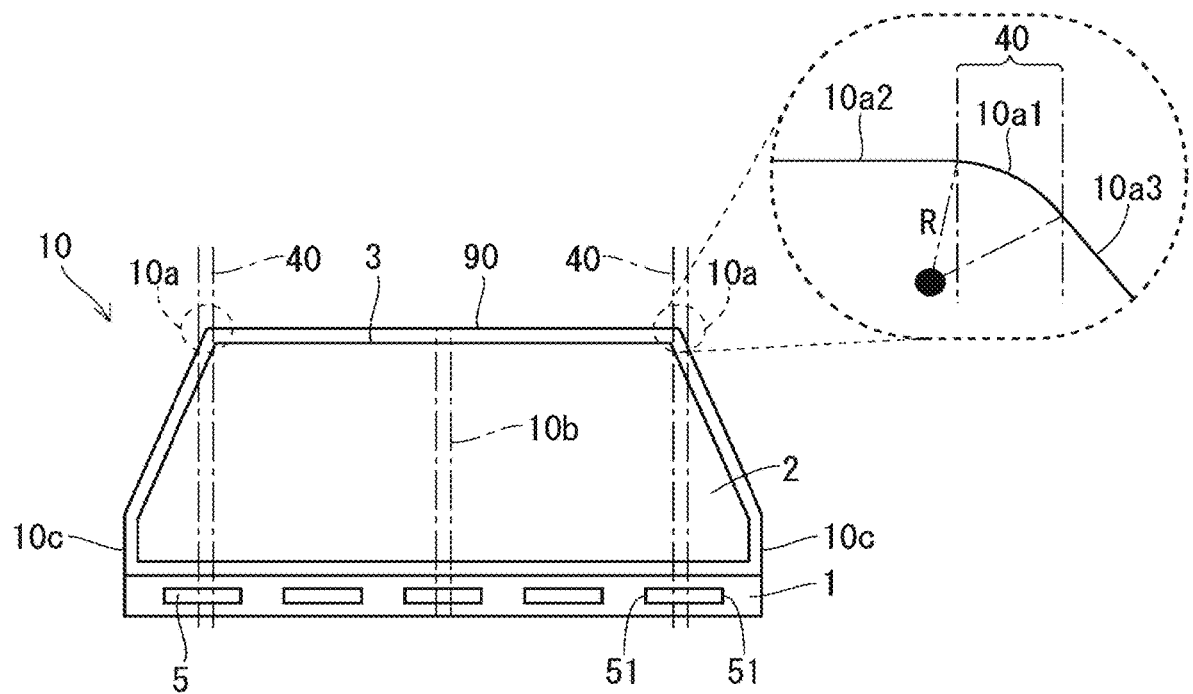
FIG. 15 is a plan view illustrating the appearance of the liquid crystal panel according to Embodiment 1.

FIG. 15 is a plan view illustrating the appearance of the liquid crystal panel 10 of the non-rectangular curved display device 100 according to Embodiment 1. Each of the corner portions 10a of the liquid crystal panel 10 includes the arc portion 10a1 and the straight line portions 10a2 and 10a3. The straight line portion 10a2, the arc portion 10a1, and the straight line portion 10a3 are obtained to be continuous through scribing.

In the arc portion 10a1 having a radius of curvature R of 4 mm to 5 mm, the cracks 20 as shown in FIG. 12 are observed. In this case, the arc portion 10a1 is an area (location) having low cutting quality.

While an example in which the cracks are observed in the arc portion 10a1 is described in Embodiment 1, microcracks that cannot be observed under a microscope with approximately 200× magnification can be caused by optimizing a scribing condition in the arc portion 10a1. Depending on the scribing condition, the cracks or the microcracks can be caused in the arc portion 10a1 and in the straight line portions 10a2 and 10a3 around the arc portion 10a1.

As described above, in the liquid crystal panel 10 according to Embodiment 1, the liquid crystal driving ICs 5 are connected to the array substrate 1 using the anisotropic conductive films, and stress that is approximately 10% to 100% higher than that caused at the locations of each of the liquid crystal driving ICs 5 other than the opposite ends 51 is caused at the opposite ends 51 of each of the liquid crystal driving ICs 5.

In the liquid crystal panel 70 having a rectangular shape illustrated in FIG. 6, stress caused by uniform curving is distributed along the rectangular shape. On the other hand, the liquid crystal driving ICs 5 are not arranged to be in contact with opposite ends of the liquid crystal panel 70 because of constraints on arrangement of wiring of the array substrate 1. Thus, none of the opposite ends 51 of the liquid crystal driving ICs 5 at which stress is concentrated and increased are located on straight lines extending from corner portions 70a having low cutting quality in the transverse direction of the liquid crystal panel 70. The problem with durability is thus not caused in the liquid crystal panel 70 having the rectangular shape illustrated in FIG. 6. The problem with durability, however, is caused in the non-rectangular curved display device having the non-rectangular shape.

To address the problem, the liquid crystal panel 10 in Embodiment 1 is configured so that the opposite ends 51 of the liquid crystal driving ICs 5 at which stress is concentrated and increased are each located, in plan view, to be out of the straight lines extending from the corner portions 10a having low cutting quality in the transverse direction of the liquid crystal panel 10. That is to say, the liquid crystal panel 10 is configured so that none of the opposite ends 51 of the liquid crystal driving ICs 5 are located within areas 40 illustrated in FIG. 15.

The areas 40 are located on the straight lines extending from the corner portions 10a in the transverse direction of the liquid crystal panel 10. The areas 40 in FIG. 15 are located on straight lines extending from the arc portions 10a1 having low cutting quality in the transverse direction of the liquid crystal panel 10, but are not limited to these areas. For example, the areas 40 may be located on straight lines extending from the arc portions 10a1 and at least one of the straight line portions 10a2 and 10a3 in the transverse direction of the liquid crystal panel 10. It is preferable to change dimensions of the areas 40 based on the dimensions, the shapes, the scribing condition, and the like of the corner portions 10a having low cutting quality. The cracks are sometimes observed especially around the arc portion 10a1, so that the dimensions of the areas 40 are not particularly limited, and it is preferable to set optimum dimensions as appropriate.

Summary of Embodiment 1

To evaluate durability of the liquid crystal panel 10 according to Embodiment 1, the liquid crystal panel 10 according to Embodiment 1 in which the opposite ends 51 of the liquid crystal driving ICs 5 were located to be out of the areas 40 was manufactured as a 1-1 sample. A liquid crystal panel which had the same outline shape as the liquid crystal panel 10 and in which any of the opposite ends 51 of the liquid crystal driving ICs 5 was located within the areas 40 was manufactured as a 1-2 sample. Ten 1-1 samples and ten 1-2 samples each boned to the protective plate 6 having a curved surface having a radius of curvature of 500 mm using the adhesive sheet 7 having a thickness of 175 μm were herein manufactured. The number of cracked samples was evaluated after they were stored for 500 hours under a high-temperature high-humidity environment at a temperature of 85° C. and a humidity of 85% as conditions to accelerate stress corrosion caused by moisture.

Figures 16, 17:
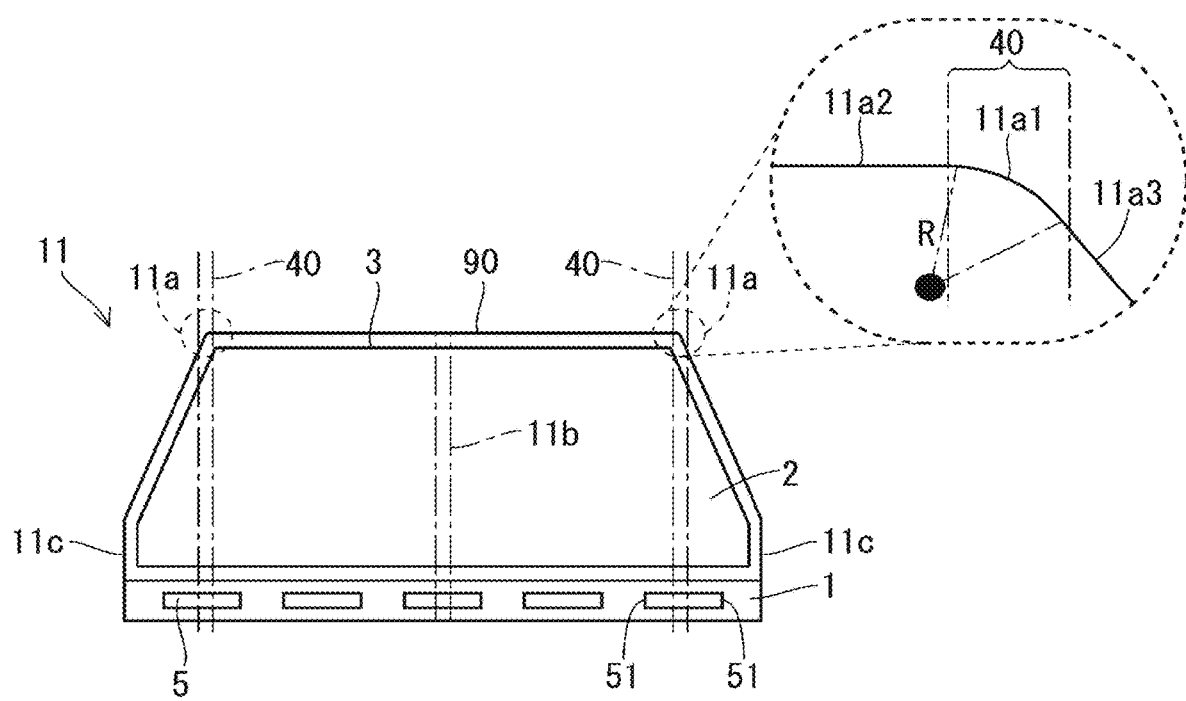
FIG. 16 shows results of an accelerated test of the liquid crystal panel according to Embodiment 1.
FIG. 17 is a plan view illustrating appearance of a liquid crystal panel according to a modification of Embodiment 1.

FIG. 16 shows results of the accelerated test. As for the 1-2 sample, there was a sample cracked before the accelerated test, and an increase in number of cracked samples was observed in the accelerated test. When the cracked samples were checked, cracking was caused from the corner portions 10a. As described above, durability was reduced in the 1-2 sample in which any of the opposite ends 51 of the liquid crystal driving ICs 5 were located, in plan view, on the straight lines extending from the corner portions 10a having low cutting quality in the transverse direction of the liquid crystal panel 10.

On the other hand, no cracking failure was observed before and after the accelerated test in the 1-1 sample. As described above, durability was not reduced in the 1-1 sample in which the opposite ends 51 of the liquid crystal driving ICs 5 were located, in plan view, to be out of the straight lines extending from the corner portions 10a in the transverse direction of the liquid crystal panel 10. That is to say, the non-rectangular curved display device 100 according to Embodiment 1 can suppress stress concentration in the corner portions 10a having low cutting quality, and increase durability against cracking, that is, resistance to cracking.

Modification of Embodiment 1

FIG. 17 is a plan view illustrating appearance of a liquid crystal panel 11 of the non-rectangular curved display device 100 according to a modification of Embodiment 1. The liquid crystal panel 11 has corner portions 11a, a valley 11b, and opposite ends 11c respectively similar to the corner portions 10a, the valley 10b, and the opposite ends 10c of the liquid crystal panel 10 (FIG. 15).

Each of the corner portions 11a of the liquid crystal panel 11, however, includes an arc portion 11a1 and two arc-like curved line portions 11a2 and 11a3 as two side portions connected by the arc portion 11a1. The curved line portion 11a2, the arc portion 11a1, and the curved line portion 11a3 are obtained to be continuous through scribing. The arc portion 11a1 has a radius of curvature R of 5 mm, and each of the curved line portions 11a2 and 11a3 has a radius of curvature of 800 mm. As described above, the arc portion 11a1 has curvature different from that of each of the curved line portions 11a2 and 11a3.

The cracks 20 as shown in FIG. 12 are observed in the arc portion 11a1. The cracks 20 as shown in FIG. 12 are also observed in a portion from the boundary between the arc portion 11a1 and the curved line portion 11a2 to a first position from the boundary towards the curved line portion 11a2 by 500 μm and in a portion from the boundary between the arc portion 11a1 and the curved line portion 11a3 to a second position from the boundary towards the curved line portion 11a3 by 500 μm. The distance between the boundary between the arc portion 11a1 and the curved line portion 11a2 and the boundary between the arc portion 11a1 and the curved line portion 11a3 is approximately 5 mm. In this case, a portion from the first position to the second position is the area (location) having low cutting quality.

As with the liquid crystal panel 10 according to Embodiment 1, in the liquid crystal panel 11 according to the modification, the liquid crystal driving ICs 5 are connected to the array substrate 1 using the anisotropic conductive films, and stress that is approximately 10% to 100% higher than that caused at the locations of each of the liquid crystal driving ICs 5 other than the opposite ends 51 is caused at the opposite ends 51 of each of the liquid crystal driving ICs 5.

To address the problem, as in Embodiment 1, the liquid crystal panel 11 according to the modification is configured so that the opposite ends 51 of the liquid crystal driving ICs 5 are each located to be out of straight lines extending from the corner portions 11a in the transverse direction of the liquid crystal panel 11. That is to say, the liquid crystal panel 11 is configured so that none of the opposite ends 51 of the liquid crystal driving ICs 5 are located within the areas 40 illustrated in FIG. 17. The areas 40 in FIG. 17 are each located on a straight line extending from the portion from the first position to the second position having low cutting quality in the transverse direction of the liquid crystal panel 11, but are not limited to these areas as described in Embodiment 1.

To evaluate durability of the liquid crystal panel 11 according to the modification, the liquid crystal panel 11 according to the modification in which the opposite ends 51 of the liquid crystal driving ICs 5 were located to be out of the areas 40 was manufactured as a 2-1 sample. A liquid crystal panel which had the same outline shape as the liquid crystal panel 11 and in which any of the opposite ends 51 of the liquid crystal driving ICs 5 were located within the areas 40 was manufactured as a 2-2 sample. Details of the samples and an evaluation method were similar to those in Embodiment 1.

Figures 18, 19:
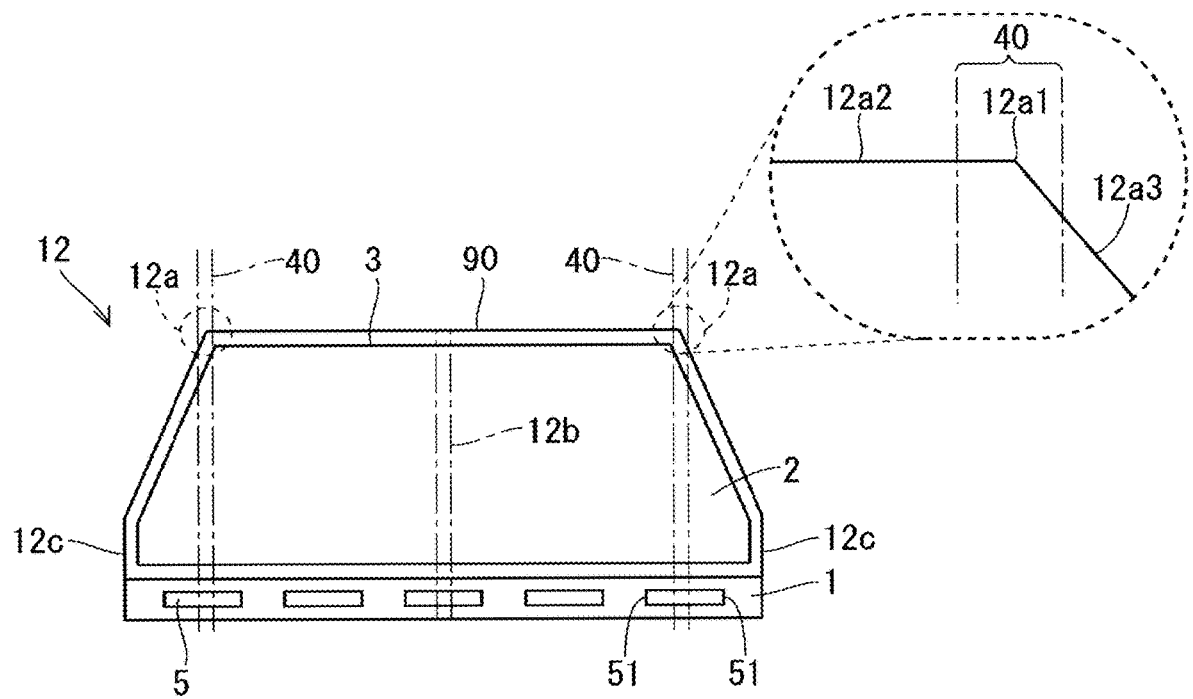
FIG. 18 shows results of the accelerated test of the liquid crystal panel according to the modification of Embodiment 1.
FIG. 19 is a plan view illustrating appearance of a liquid crystal panel according to Embodiment 2.

FIG. 18 shows results of the accelerated test. As for the 2-2 sample, there were samples cracked before the accelerated test, and an increase in number of cracked samples was observed in the accelerated test. When the cracked samples were checked, cracking was caused from the corner portions 11a. On the other hand, no cracking failure was observed before and after the accelerated test in the 2-1 sample. As described above, the non-rectangular curved display device 100 according to the modification can suppress stress concentration in the corner portions 11a having low cutting quality, and increase durability against cracking, that is, resistance to cracking.

In the above-mentioned description, each of the corner portions includes the arc portion and the two straight line portions or the two curved line portions connected by the arc portion. Each of the corner portions, however, is not limited to it, and may include an arc portion and one straight line portion and one curved line portion connected by the arc portion.

Embodiment 2

In Embodiment 2 of the present invention, the shape of and a method of manufacturing the corner portions are different from those in Embodiment 1. A configuration other than the shape of and the method of manufacturing the corner portions in Embodiment 2 is similar to that in Embodiment 1, so that description thereof is sometimes omitted in Embodiment 2.

FIG. 19 is a plan view illustrating appearance of a liquid crystal panel 12 of the non-rectangular curved display device 100 according to Embodiment 2 of the present invention. The liquid crystal panel 12 has corner portions 12a, a valley 12b, and opposite ends 12c respectively similar to the corner portions 10a, the valley 10b, and the opposite ends 10c of the liquid crystal panel 10 (FIG. 15).

Each of the corner portions 12a of the liquid crystal panel 12, however, includes a corner 12a1 at which straight line portions of two sides are connected to each other and two straight line portions 12a2 and 12a3 as two side portions connected by the corner 12a1. The straight line portion 12a2, the corner 12a1, and the straight line portion 12a3 are obtained to be continuous through scribing.

In actuality, when the straight line portion 12a3 is scribed after scribing of the straight line portion 12a2 so that scribe lines do not meet each other, an area located 2 mm from an intersection to become the corner 12a1 is provided as a so-called intersection-skipping portion in which scribing is not performed. This is because, if scribing is performed over a previously-scribed portion, a problem, such as chipping and cracking in a direction different from a scribing direction, can occur at the intersection at which the scribe lines meet each other.

Even in a case where the intersection-skipping portion is provided, however, vertical cracks for dividing cannot properly be formed through scribing. Thus, the cracks 20 are observed as in the cut surface of the corner portion shown in FIG. 12, for example, and the corner portions 12a have lower cutting quality than the straight line portion 90 shown in FIG. 13. The same applies to the corner portions 70a of the liquid crystal panel 70 in FIG. 6.

With a configuration in FIG. 19, the cracks 20 as shown in FIG. 12 are observed at the corner 12a1. The cracks 20 as shown in FIG. 12 are also observed in a portion from the corner 12a1 to a third position from the corner 12a1 towards the straight line portion 12a2 by 2 mm and in a portion from the corner 12a1 to a fourth position from the corner 12a1 towards the straight line portion 12a3 by 2 mm. In this case, a portion from the third position to the fourth position having a length of 4 mm is the area (location) having low cutting quality.

As with the liquid crystal panel 10 according to Embodiment 1, in the liquid crystal panel 12 according to Embodiment 2, the liquid crystal driving ICs 5 are connected to the array substrate 1 using the anisotropic conductive films, and stress that is approximately 10% to 100% higher than that caused at the locations of each of the liquid crystal driving ICs 5 other than the opposite ends 51 is caused at the opposite ends 51 of each of the liquid crystal driving ICs 5.

To address the problem, as in Embodiment 1, the liquid crystal panel 12 according to Embodiment 2 is configured so that the opposite ends 51 of the liquid crystal driving ICs 5 are each located to be out of straight lines extending from the corner portions 12a in the transverse direction of the liquid crystal panel 12. That is to say, the liquid crystal panel 12 is configured so that none of the opposite ends 51 of the liquid crystal driving ICs 5 are located within the areas 40 illustrated in FIG. 19. The areas 40 in FIG. 19 are each located on a straight line extending from the portion from the third position to the fourth position having low cutting quality in the transverse direction of the liquid crystal panel 12, but are not limited to these areas as described in Embodiment 1.

Summary of Embodiment 2

To evaluate durability of the liquid crystal panel 12 according to Embodiment 2, the liquid crystal panel 12 according to Embodiment 2 in which the opposite ends 51 of the liquid crystal driving ICs 5 were located to be out of the areas 40 was manufactured as a 3-1 sample. A liquid crystal panel which had the same outline shape as the liquid crystal panel 12 and in which any of the opposite ends 51 of the liquid crystal driving ICs 5 were located within the areas 40 was manufactured as a 3-2 sample. Ten 3-1 samples and ten 3-2 samples each boned to the protective plate 6 having the curved surface having a radius of curvature of 500 mm using the adhesive sheet 7 having a thickness of 175 μm were herein manufactured. The number of cracked samples was evaluated after they were stored for 500 hours under the high-temperature high-humidity environment at a temperature of 85° C. and a humidity of 85% as the conditions to accelerate stress corrosion caused by moisture.

Figures 20, 21:
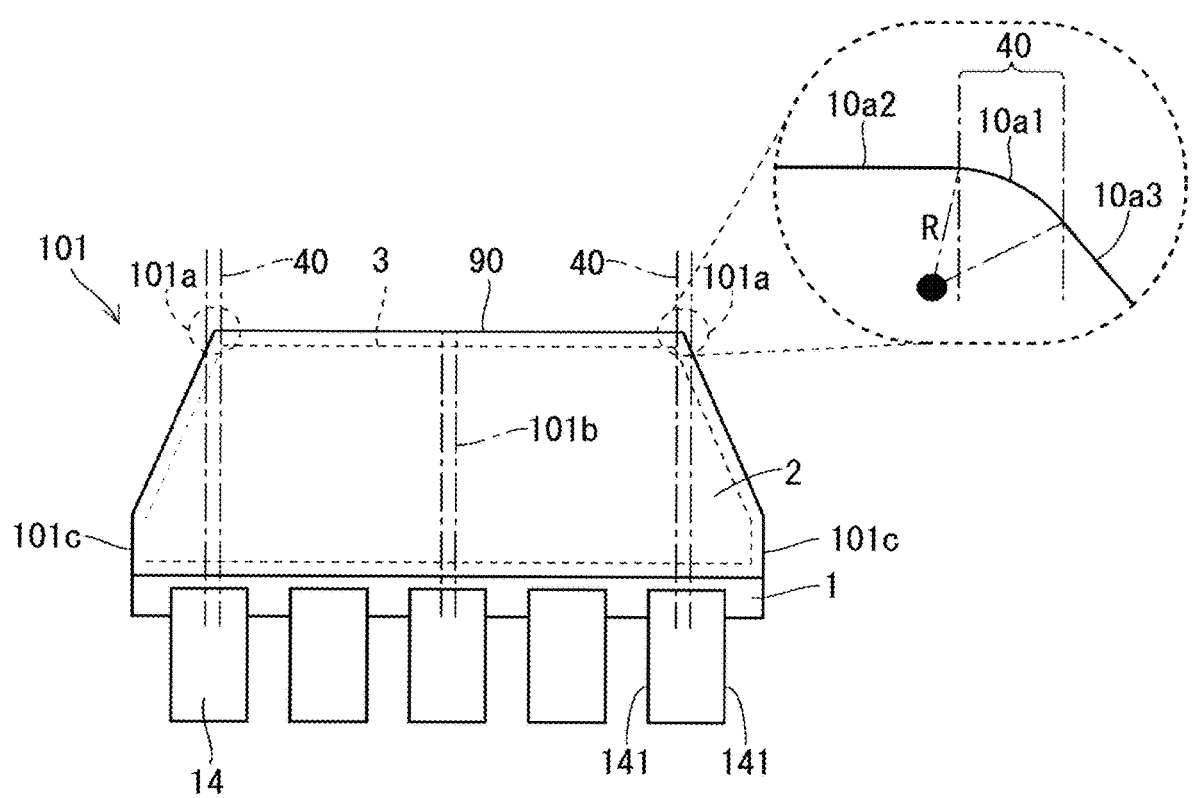
FIG. 20 shows results of the accelerated test of the liquid crystal panel according to Embodiment 2.
FIG. 21 is a plan view illustrating appearance of a liquid crystal panel according to Embodiment 3.

FIG. 20 shows results of the accelerated test. As for the 3-2 sample, there was a sample cracked before the accelerated test, and an increase in number of cracked samples was observed in the accelerated test. When the cracked samples were checked, cracking was caused from the corner portions 12a. As described above, durability was reduced in the 3-2 sample in which any of the opposite ends 51 of the liquid crystal driving ICs 5 were located, in plan view, on the straight lines extending from the corner portions 12a having low cutting quality in the transverse direction of the liquid crystal panel 12.

On the other hand, no cracking failure was observed before and after the accelerated test in the 3-1 sample. As described above, durability was not reduced in the 3-1 sample in which the opposite ends 51 of the liquid crystal driving ICs 5 were located, in plan view, to be out of the straight lines extending from the corner portions 12a in the transverse direction of the liquid crystal panel 12. That is to say, the non-rectangular curved display device 100 according to Embodiment 2 can suppress stress concentration in the corner portions 12a having low cutting quality, and increase durability against cracking, that is, resistance to cracking.

Embodiment 3

Embodiment 3 of the present invention is different from Embodiment 1, the modification of Embodiment 1, and Embodiment 2 in that the liquid crystal driving ICs 5 are replaced by flexible printed circuit boards 14. That is to say, electronic parts arranged on the array substrate 1 are the liquid crystal driving ICs 5 in Embodiment 1 and the like, but are the flexible printed circuit boards 14 in Embodiment 3. A configuration other than the flexible printed circuit boards 14 as replacements for the liquid crystal driving ICs 5 in Embodiment 3 is similar to that in Embodiment 1, the modification of Embodiment 1, and Embodiment 2, so that description thereof is sometimes omitted in Embodiment 3.

Figure 22:
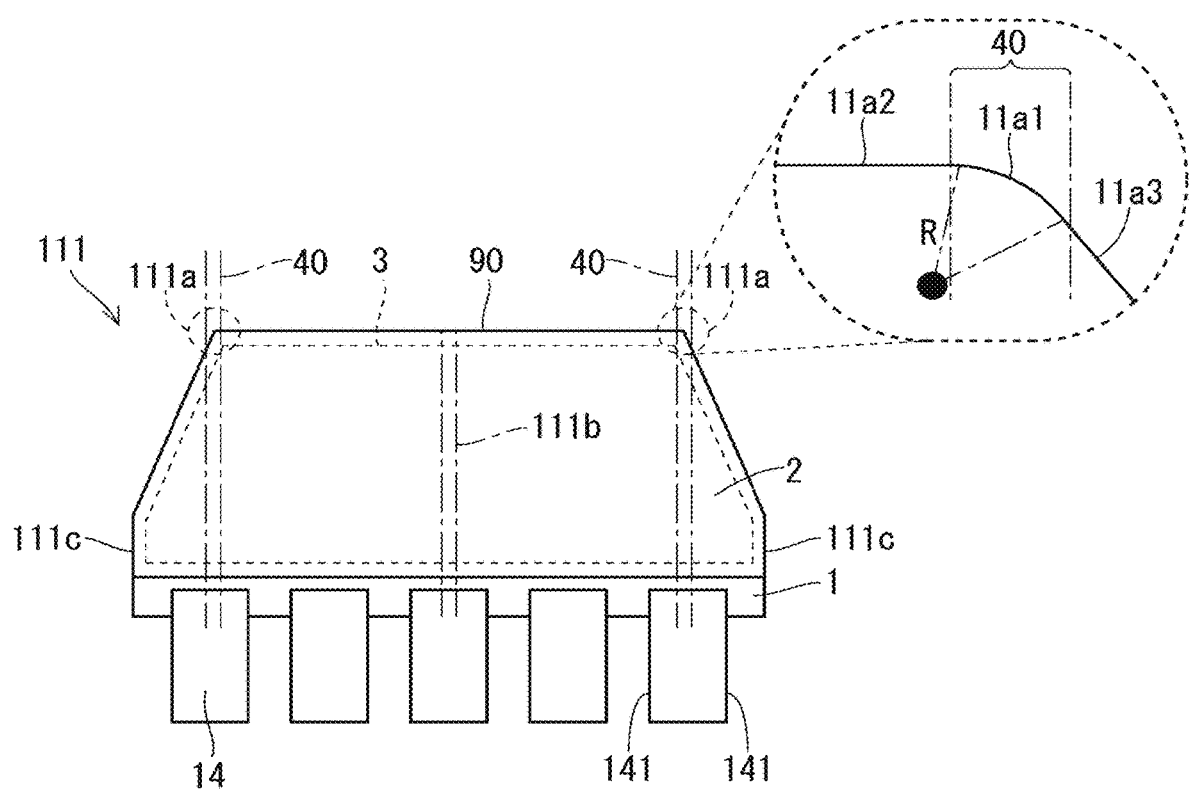
FIG. 22 is a plan view illustrating appearance of a liquid crystal panel according to Embodiment 3.
Figure 23:
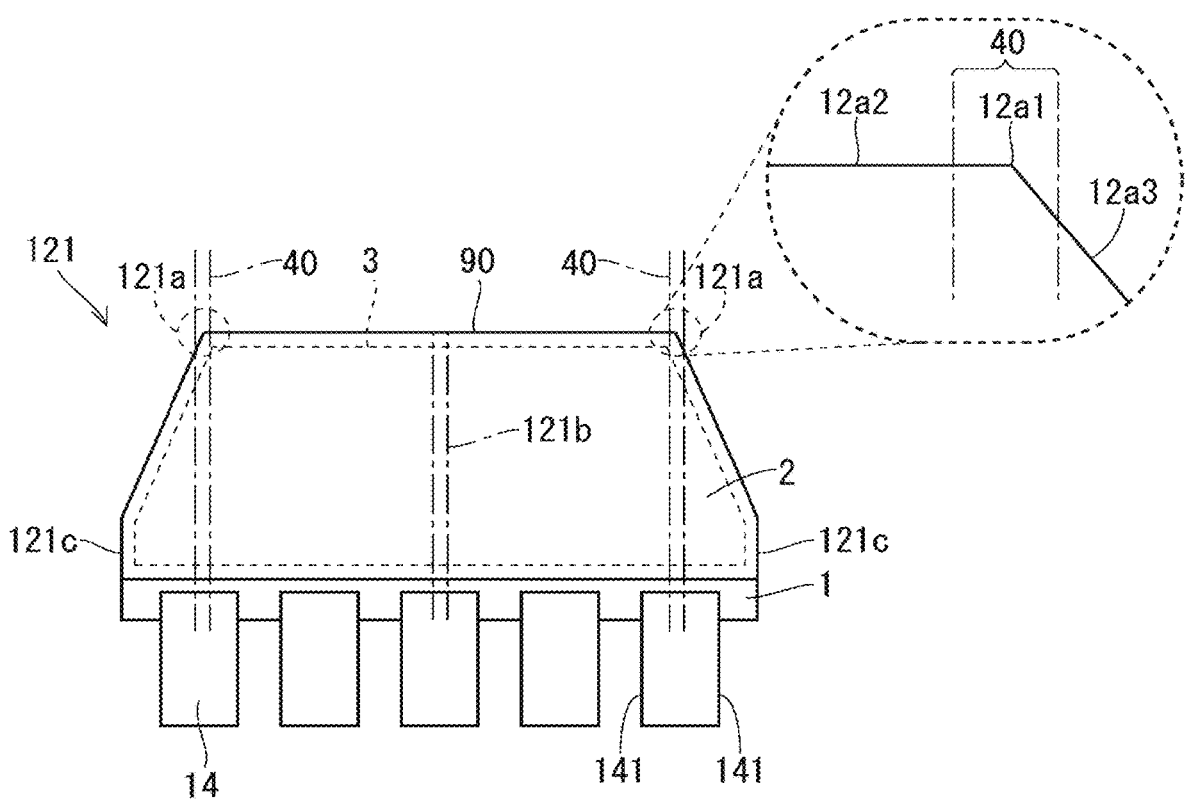
FIG. 23 is a plan view illustrating appearance of a liquid crystal panel according to Embodiment 3.

FIGS. 21, 22, and 23 are plan views illustrating appearances of liquid crystal panels 101, 111, and 121 of the non-rectangular curved display device 100 according to Embodiment 3. As illustrated in FIG. 21, the liquid crystal panel 101 has corner portions 101a, a valley 101b, and opposite ends 101c. As illustrated in FIG. 22, the liquid crystal panel 111 has corner portions 111a, a valley 111b, and opposite ends 111c. As illustrated in FIG. 23, the liquid crystal panel 121 has corner portions 121a, a valley 121b, and opposite ends 121c.

The liquid crystal panels 101, 111, and 121 illustrated in FIGS. 21, 22, and 23 are herein respectively similar to the liquid crystal panels 10, 11, and 12 illustrated in FIGS. 15, 17, and 19 except that the liquid crystal driving ICs 5 in FIGS. 15, 17, and 19 are replaced by the flexible printed circuit boards 14. For example, the corner portions 101a, the valley 101b, and the opposite ends 101c of the liquid crystal panel 101 (FIG. 21) respectively correspond to the corner portions 10a, the valley 10b, and the opposite ends 10c of the liquid crystal panel 10 (FIG. 15). The corner portions 101*a*, 111*a*, and 121*a* of the respective liquid crystal panels 101, 111, and 121 are formed on the same scribing conditions as those for the corner portions 10*a*, 11*a*, and 12*a* of the respective liquid crystal panels 10, 11, and 12 in FIGS. 15, 17, and 19, so that description thereof is omitted in Embodiment 3.

A method of manufacturing the non-rectangular curved display device according to Embodiment 3 can be described by replacing the liquid crystal driving ICs 5 with the flexible printed circuit boards 14 in the implementing process of the method of manufacturing the non-rectangular curved display device according to Embodiment 1. Specifically, in the implementing process in Embodiment 3, the flexible printed circuit boards 14, the control substrate, liquid crystal driving ICs provided to the flexible printed circuit boards 14 and the control substrate, and the like are connected to the wiring of the array substrate 1. The flexible printed circuit boards 14 and the like are connected to the wiring, for example, using the anisotropic conductive films. An example in which the liquid crystal driving ICs are replaced by the flexible printed circuit boards 14 is described in Embodiment 3, but the wiring of the array substrate 1 may be connected to the liquid crystal driving ICs, and further the liquid crystal driving ICs and the flexible printed circuit boards 14 may be connected through the wiring of the array substrate 1. That is to say, a plurality of electronic parts may be arranged on the array substrate 1, and the electronic parts may be a combination of the liquid crystal driving ICs 5 and the flexible printed circuit boards 14.

<Stress Concentration in Flexible Printed Circuit Boards>

Figures 24, 25:
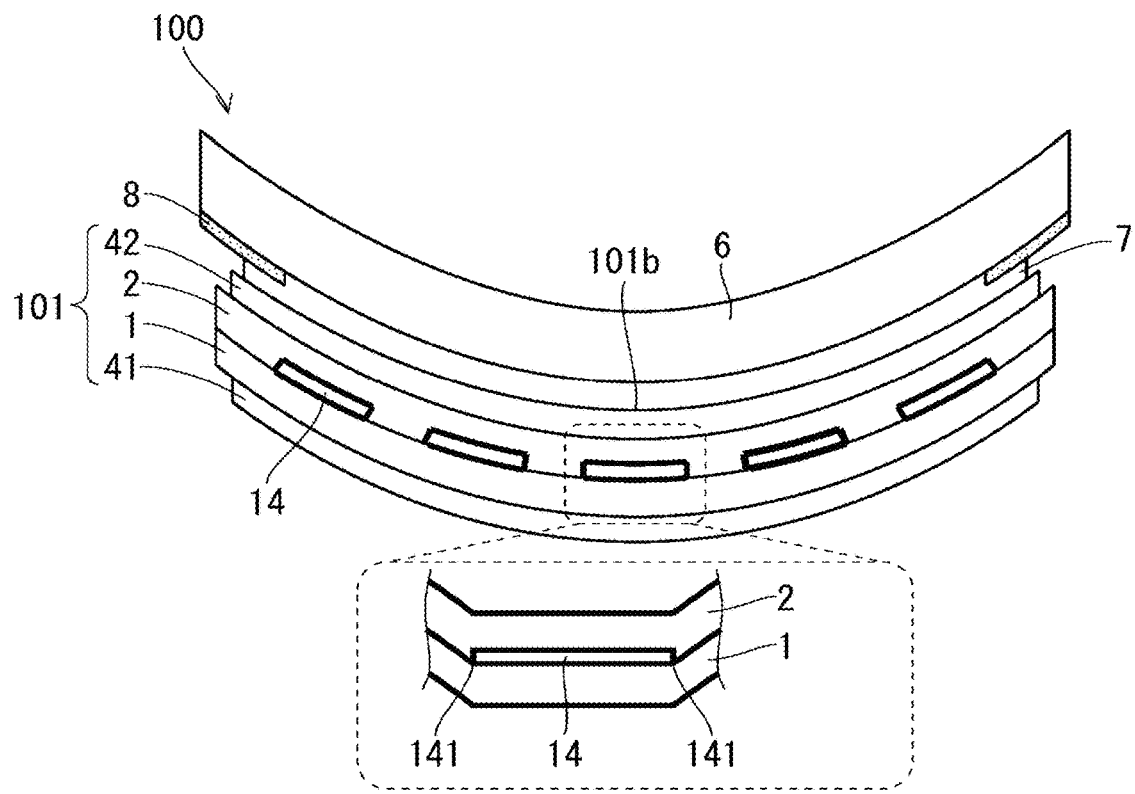
FIG. 24 is a plan view illustrating appearance of the liquid crystal panel according to Embodiment 3.
FIG. 25 shows results of the accelerated test of the liquid crystal panel according to Embodiment 3.

FIG. 24 is a sectional view of the non-rectangular curved display device 100 including the liquid crystal panel 101 as viewed from a direction similar to the direction of the arrow E of FIG. 7. FIG. 24 includes an enlarged view of one of the flexible printed circuit boards 14 and its surroundings. The non-rectangular curved display device 100 including the liquid crystal panel 111 and the non-rectangular curved display device 100 including the liquid crystal panel 121 are each similar to that including the liquid crystal panel 101, so that illustration and description thereof are omitted.

As described above, the flexible printed circuit boards 14 are connected to the array substrate 1 using the anisotropic conductive films. The array substrate 1 has a greater thickness in portions in which the flexible printed circuit boards 14 are provided than in portions in which the flexible printed circuit boards 14 are not provided, so that stiffness at curving is relatively high in the portions in which the flexible printed circuit boards 14 are provided. On the other hand, at locations at which the portions in which the flexible printed circuit boards 14 are provided and the portions in which the flexible printed circuit boards 14 are not provided are contiguous with each other, that is to say, at opposite ends 141 being two ends of each of the flexible printed circuit boards 14 opposing in the longitudinal direction of each of the liquid crystal panels 101, 111, and 121, stress when the liquid crystal panels 101, 111, and 121 are curved is not constant, and stress is concentrated at the opposite ends 141 of each of the flexible printed circuit boards 14.

A ratio of strain at the opposite ends 141 of each of the flexible printed circuit boards 14 to strain at locations of each of the flexible printed circuit boards 14 other than the opposite ends 141, that is to say, a stress concentration factor is in a range of approximately 1.1 to 1.7, as obtained through actual measurement of the strain at the opposite ends 141 of each of the flexible printed circuit boards 14 and the strain at the locations of each of the flexible printed circuit boards 14 other than the opposite ends 141. As described above, there is a problem in that stress that is approximately 10% to 70% higher than that caused at the locations of each of the flexible printed circuit boards 14 other than the opposite ends 141 is caused at the opposite ends 141 of each of the flexible printed circuit boards 14.

To address the problem, the liquid crystal panels 101, 111, and 121 in Embodiment 3 are configured so that the opposite ends 141 of the flexible printed circuit boards 14 are each located to be out of straight lines extending from the corner portions 101*a*, 111*a*, and 121*a* in the transverse directions of the liquid crystal panels 101, 111, and 121 (extension directions from the corner portions 101*a*, 111*a*, and 121*a* parallel to directions in which the valleys 101*b*, 111*b*, and 121*b* extend). That is to say, the liquid crystal panels 101, 111, and 121 are configured so that none of the opposite ends 141 of the flexible printed circuit boards 14 are located within the areas 40 illustrated in FIGS. 21, 22, and 23. The areas 40 in FIGS. 21, 22, and 23 are each located on a straight line extending from the portion from the third position to the fourth position having low cutting quality in the transverse directions of the liquid crystal panels 101, 111, and 121, but are not limited to these areas as described in Embodiment 1.

Summary of Embodiment 3

To evaluate durability of the liquid crystal panels 101, 111, and 121 according to Embodiment 3, the liquid crystal panels 101, 111, and 121 in each of which the opposite ends 141 of the flexible printed circuit boards 14 were located to be out of the areas 40 were manufactured as 1-3, 2-3, and 3-3 samples. Liquid crystal panels which had the same outline shapes as the liquid crystal panels 101, 111, and 121 and in each of which any of the opposite ends 141 of the flexible printed circuit boards 14 were located within the areas 40 were manufactured as 1-4, 2-4, and 3-4 samples. Ten 1-3 samples, ten 1-4 samples, ten 2-3 samples, ten 2-4 samples, ten 3-3 samples, and ten 3-4 samples each boned to the protective plate 6 having the curved surface having a radius of curvature of 500 mm using the adhesive sheet 7 having a thickness of 175 μm were herein manufactured. The number of cracked samples was evaluated after they were stored for 500 hours under the high-temperature high-humidity environment at a temperature of 85° C. and a humidity of 85% as the conditions to accelerate stress corrosion caused by moisture.

FIG. 25 shows results of the accelerated test. As for the 3-4 sample, there was a sample cracked before the accelerated test, and an increase in number of cracked samples was observed in the accelerated test. When the cracked samples were checked, cracking was caused from the corner portions 101*a*, 111*a*, and 121*a*. As described above, durability was reduced in the 1-4, 2-4, and 3-4 samples in which any of the opposite ends 141 of the flexible printed circuit boards 14 were located, in plan view, on the straight lines extending from the corner portions 101*a*, 111*a*, and 121*a* having low cutting quality in the transverse directions of the liquid crystal panels 101, 111, and 121.

On the other hand, no cracking failure was observed before and after the accelerated test in the 1-3, 2-3, and 3-3 samples. As described above, durability was not reduced in the 1-3, 2-3, and 3-3 samples in which the opposite ends 141 of the flexible printed circuit boards 14 were located, in plan view, to be out of the straight lines extending from the corner portions 101*a*, 111*a*, and 121*a* in the transverse directions of the liquid crystal panels 101, 111, and 121. That is to say, the non-rectangular curved display device 100 according to Embodiment 3 can suppress stress concentration in the corner portions 101a, 111a, and 121a having low cutting quality, and increase durability against cracking, that is, resistance to cracking.

Embodiments and modifications of the present invention can freely be combined with each other, and can be modified or omitted as appropriate within the scope of the invention.

While the invention has been described in detail, the foregoing description is in all aspects illustrative and not restrictive. It is understood that numerous modifications not having been described can be devised without departing from the scope of the present invention.

EXPLANATION OF REFERENCE SIGNS

1 array substrate, 5 liquid crystal driving IC, 51 and 141 opposite ends, 10, 11, 12, 101, 111, and 121 liquid crystal panel, 10a, 11a, 12a, 101a, 111a, and 121a corner portion, 10a1 and 11a1 arc portion, 10a2 and 10a3 straight line portion, 11a2 and 11a3 curved line portion, 12a1 corner, 10b, 11b, 12b, 101b, 111b, and 121b valley, 10c, 11c, 12c, 101c, 111c, and 121c opposite ends, 100 non-rectangular curved display device, 14 flexible printed circuit board.

The invention claimed is:

1. A display device, comprising:
a display panel including a substrate; and
a plurality of electronic parts each disposed in a first direction on the substrate in plan view, the electronic parts being driving integrated circuits (ICs) or flexible printed circuit boards, wherein
the display panel has, in plan view, a non-rectangular outline shape and includes a corner portion located between opposite ends of the display panel opposing in the first direction and formed by a curved line or two straight lines,
the display panel is curved to have a valley extending in a second direction perpendicular to the first direction between the opposite ends of the outline shape,
the corner portion includes a first corner portion and a second corner portion, each of the first corner portion and the second corner portion includes an arc portion, a first side portion directly connected to one end of the arc portion, and a second side portion directly connected to the other end of the arc portion, and each of the first side portion and the second side portion is a straight line portion or a curved line portion having different curvature from the arc portion,
the electronic parts include a first electronic part and a second electronic part,
opposite ends being two ends of the first electronic part opposing in the first direction are each located, in plan view, to be out of a first straight line extending from the first corner portion in the second direction, and the first straight line has a line width such that the first straight line overlaps, in plan view, with the first side portion, the arc portion and the second side portion of the first corner portion in the first direction,
a portion of the first electronic part other than the opposite ends includes a portion overlapping, in plan view, with the first straight line,
opposite ends being two ends of the second electronic part opposing in the first direction are each located, in plan view, to be out of a second straight line extending from the second corner portion in the second direction, and the second straight line has a line width such that the second straight line overlaps, in plan view, with the first side portion, the arc portion and the second side portion of the second corner portion in the first direction, and
a portion of the second electronic part other than the opposite ends includes a portion overlapping, in plan view, with the second straight line.

2. The display device according to claim 1, wherein the first side portion and the second side portion are straight line portions.

3. The display device according to claim 1, wherein the first side portion and the second side portion include one straight line portion and one curved line portion, or are curved line portions.

4. The display device according to claim 1, wherein the electronic parts include a third electronic part disposed between the first electronic part and the second electronic part.

\* \* \* \* \*